(12) United States Patent
Takahashi et al.

(10) Patent No.: US 6,257,394 B1
(45) Date of Patent: Jul. 10, 2001

(54) PART-CONVEYING APPARATUS

(75) Inventors: Shigeki Takahashi; Nihei Kaishita; Akira Nemoto, all of Omihachiman (JP)

(73) Assignee: Murata Manufacturing Co., Ltd., Nagaokakyo (JP)

( * ) Notice: Subject to any disclaimer, the term of this patent is extended or adjusted under 35 U.S.C. 154(b) by 0 days.

(21) Appl. No.: 09/343,701

(22) Filed: Jun. 30, 1999

(30) Foreign Application Priority Data

Jul. 3, 1998 (JP) .................................................. 10-188356

(51) Int. Cl.[7] .................................................. B65G 47/04
(52) U.S. Cl. ........................................... 198/530; 221/227
(58) Field of Search .................................... 221/277, 289, 221/7, 15; 198/530, 532, 468.9, 468.11

(56) References Cited

U.S. PATENT DOCUMENTS

| | | |
|---|---|---|
| 4,732,296 | 3/1988 | Heck et al. . |
| 5,426,930 | * 6/1995 | Badaili et al. ........................ 198/532 |
| 5,702,028 | 12/1997 | Shirodera . |

FOREIGN PATENT DOCUMENTS

| | | |
|---|---|---|
| 0 683 625 | 11/1995 | (EP) . |
| 2244482 | * 12/1991 | (GB) . |
| 2 244 482 | 12/1991 | (GB) . |
| 63-127600 | 5/1988 | (JP) . |
| 8-222890 | 8/1996 | (JP) . |
| 246292 | * 11/1969 | (RU) ..................................... 221/277 |

* cited by examiner

Primary Examiner—Kenneth W. Noland
(74) Attorney, Agent, or Firm—Burns, Doane, Swecker & Mathis, LLP

(57) ABSTRACT

A part-conveying apparatus allows parts to align and slide down a sloped chute without stacking therein. The part-conveying apparatus has a chute sloped to align and slide down parts, and a first mobile blade for slidably supporting the parts in a bottom section of the chute in the direction of the chute 9. The lower end section of the chute is connected to a horizontal guide path, and a second conveying blade movable forward and backward is provided in a bottom section of the guide path. The second conveying blade reciprocates in a manner so as to move backward faster than to move forward, thereby conveying forward the parts placed thereon. A projection in the lower end of the first mobile blade engages with a groove of the second mobile blade so as to cause fine movements of the first conveying blade in the direction of the chute in synchronous with back and forth movements of the second conveying blade 26. This allows the parts to side down.

3 Claims, 9 Drawing Sheets

PART-CONVEYING APPARATUS

BACKGROUND OF THE INVENTION

1. Field of the Invention

The present invention relates to a part-conveying apparatus, particularly, to an apparatus in which parts are aligned along a sloped chute and the parts are slid down the chute.

2. Description of the Related Art

Conventionally, as a separating and conveying apparatus for small parts such as chip parts, an apparatus as described below is known.

The apparatus has a chamber, a sloped chute, and a horizontal guide path. The chamber stores a large number of parts. The chute aligns the parts from a lower end section of the chamber and ejects the parts. The guide path is connected to the lower end section of the chute, and the parts are ejected from the end of the guide path. This type of apparatus is disclosed, for example, in Japanese Unexamined Patent Publications Nos. 63-127600 and 8-222890.

The conveying apparatus allows the parts to slide down with the weight of the parts. Therefore, the larger the slope angle in the chute, the easier the parts slide down the chute. With a large slope angle in the chute, however, the angle at which the chute intersects with the horizontal guide path also increases, in which the parts may not move smoothly in the guide path and at the intersection. In contrast, with a small slope angle in the chute, the parts move smoothly in the guide path and at the intersection, but frictional forces between the parts and the chute increase, thereby frequently causing jamming of the parts. Simple increase of the slope angle in the chute is not a sufficient measure for prevention of jams in cases where the individual parts are of a small mass, are dirty, or are electrostatically charged.

To solve these problems, proposals have been made to feed compressed air into the chute or to draw out air therefrom to force the parts to slide down. These arrangements, however, require additional devices, such as an air supply and air paths, thereby producing problems of increased cost.

SUMMARY OF THE INVENTION

In view of the problems as described above, the present invention provides a part-conveying apparatus that has a simple configuration and allows parts within a chute to slide therethrough smoothly.

To achieve this and other objects described above, the present invention provides a part-conveying apparatus that has a chute sloped to align and slide down parts, a mobile member for slidably supporting the parts in a bottom section of the chute either in the direction of or perpendicular to the chute so as to be movable, and driving means for finely moving the mobile member either in the direction of or perpendicular to the chute.

When the parts in the chute are of a small mass, are dirty, or are electrostatically charged, frictional forces may occur between the parts and the mobile member provided in a bottom section of the chute, stacking the parts and causing jams. In the present invention, however, the mobile member is finely moved either in the direction of or perpendicular to the chute to discontinue the friction, thereby allowing the parts to slide down the chute smoothly.

In the above case, the slope angle in the chute can be reduced to allow the parts to slide down smoothly. Therefore, in an arrangement where a guide path is connected to intersect with a lower end section of the chute, the angle at which the chute intersects with the guide path can also be reduced. This allows the parts to move from the chute into the guide path smoothly.

So that the mobile member may finely move, the present invention may be composed of a horizontal guide path connected to the lower end section of the chute to align and guide the parts, a conveying member in a bottom section of the horizontal guide path arranged movable forward and backward, and a conveying means for reciprocating the conveying member so as to move backward faster than to move forward and for conveying forward the parts on an upper surface of the conveying member. In this respect, the driving means may be used as an engaging section formed between the mobile member and the conveying member to finely move the mobile member either in the direction of the chute or perpendicular to the chute in coincidence with forward and backward movement of the conveying member.

In the above arrangement, since the conveying member can be used to finely move the mobile member, no particular driving mechanism need be provided, thus simplifying the configuration. Furthermore, the mobile member operates in coincidence with every feed of the parts, thereby ensuring prevention of the problem of parts being stacked and jammed.

Furthermore, the present invention may be arranged to have a guiding means for guiding the mobile member so as to be movable by a constant distance in the direction of the chute. The aforementioned driving means may be composed of a first spring for urging down the mobile member, a second spring for urging up the mobile member, and a lever to which at least one of the first spring and the second spring is connected so as to oscillate and move in the direction of the chute.

In the above, the lever oscillates and moves in a first direction to increase a spring force of the second spring to be greater than a spring force of the first spring so as to move up the mobile member. Also, the lever oscillates and moves in a second direction to increase a spring force of the first spring to be greater than a spring force of the second spring so as to move down the mobile member.

In the above arrangement, since the stroke of the mobile member can be determined according to the guiding means or without depending on the stroke of the lever. Therefore, the stroke of the mobile member can be determined with high precision. Furthermore, the size relationship in the springing force of the first and second springs causes movement of the mobile member without an excessive load being exerted. Therefore, the mobile member operates smoothly, eliminating the problems due to friction.

In the present invention, the guide path does not need to be connected to the lower end section of the chute. Furthermore, the conveying member provided in the bottom section of the guide path is not restricted to a reciprocating type. It may be displaced by a conveying member such as a belt that operates in a single direction.

Furthermore, provision of the conveying means in the guide path is not mandatory. It may be a simple arrangement in which parts that have slid down a chute are conveyed into a horizontal guide path using the falling force of the parts.

Furthermore, as is apparent from the above, compared to conventional apparatuses using compressed air or a drawn-out air, the present invention is simple in configuration. This allows reduction in cost to be achieved.

Furthermore, even with a small slope angle in the chute, the parts can be cased to slide down easily. Therefore, in an arrangement where the guide path is connected to a lower end section of the chute, the angle at which the chute and the guide path intersect can be small, by which the parts can be moved smoothly from the chute to the guide path.

DESCRIPTION OF THE PREFERRED EMBODIMENTS

First Embodiment

Figure 8:
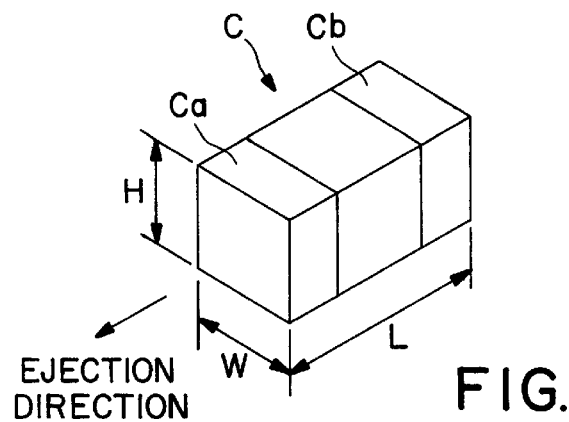
FIG. 8 is a perspective view of an example of chip parts used in the present invention.
Figure 9:
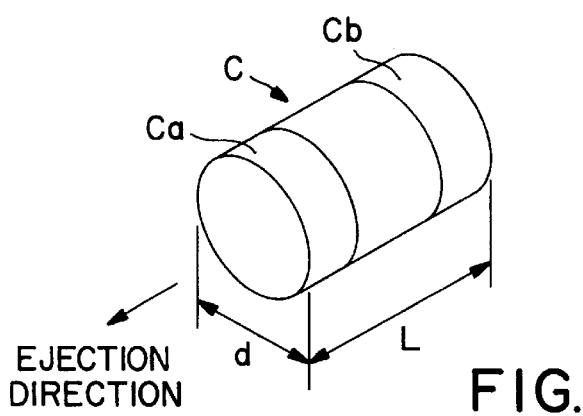
FIG. 9 is a perspective view of another example of chip parts used in the present invention.
Figure 10A:
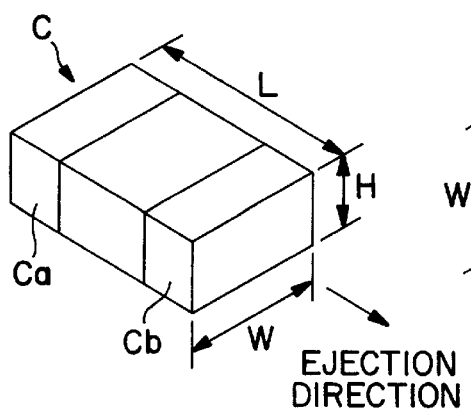
FIG. 10 is a perspective view of yet another example of chip parts used in the present invention.
Figure 10B:
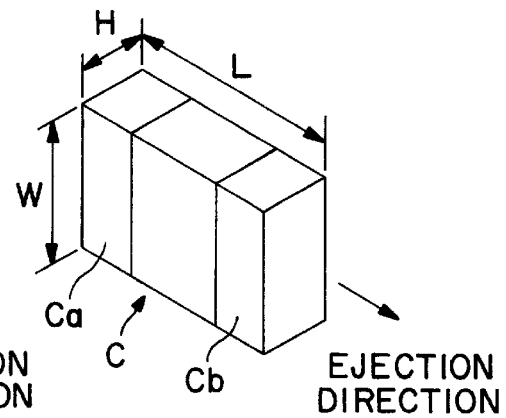

FIGS. 1 to 7 are various views of a first embodiment of a part-conveying apparatus according to the present invention. In this embodiment, a rectangular chip part C, as shown in FIG. 8, having the following dimensions is used: height= H, width=W, and length=L (H≈W; L>H; and L>W). However, as shown in FIGS. 8 and 9, the chip parts C may be cylindrically shaped and rectangularly shaped with the following dimensions: for the cylindrically shaped part, diameter=d, height=H, width=W, and length=L (d≈W and H; and L>d); and for the rectangularly shaped part, height=H, width=W, and length=L (L>W>H). In these drawings, Ca and Cb denote electrodes formed at two ends in the length direction of the individual parts C.

Figure 1:
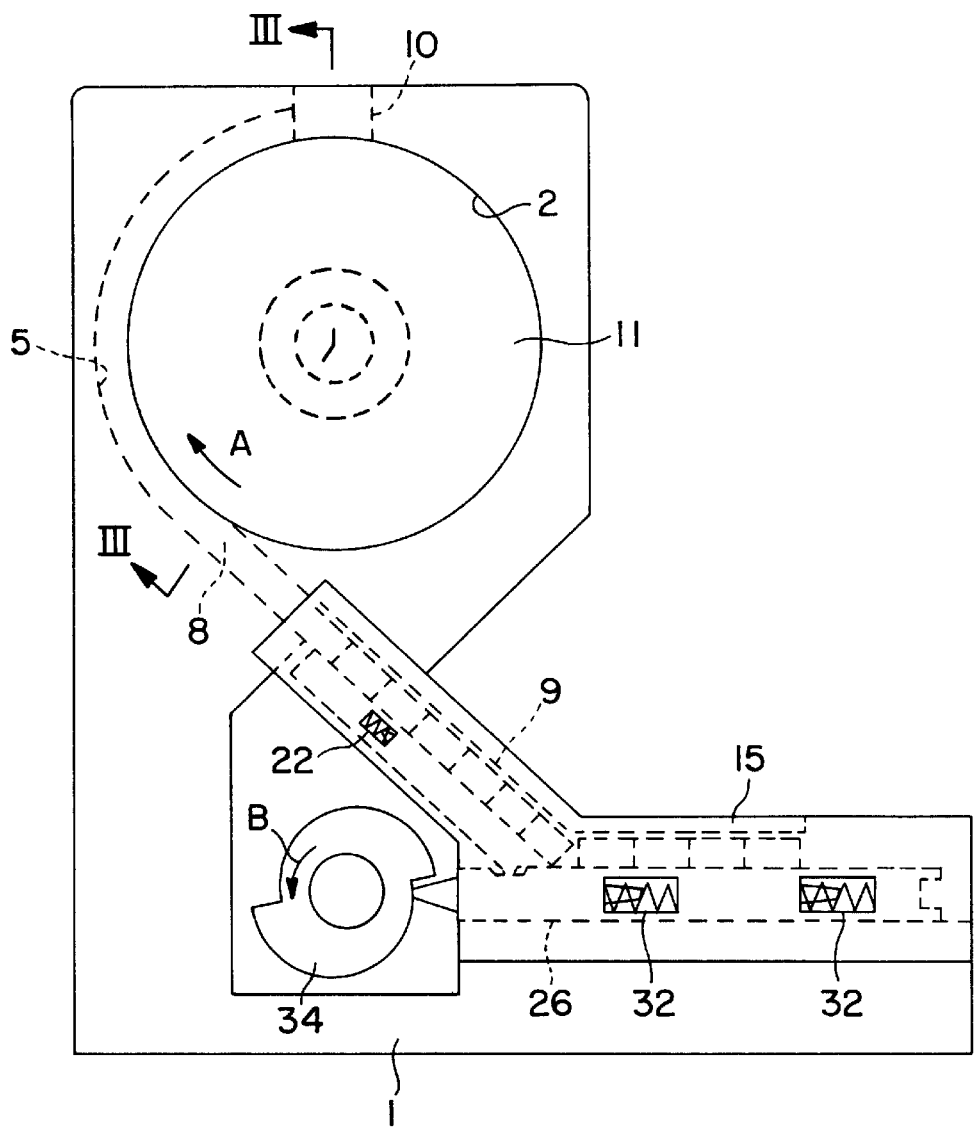
FIG. 1 is a side view of a part-conveying apparatus according to a first embodiment of the present invention.
Figure 2:
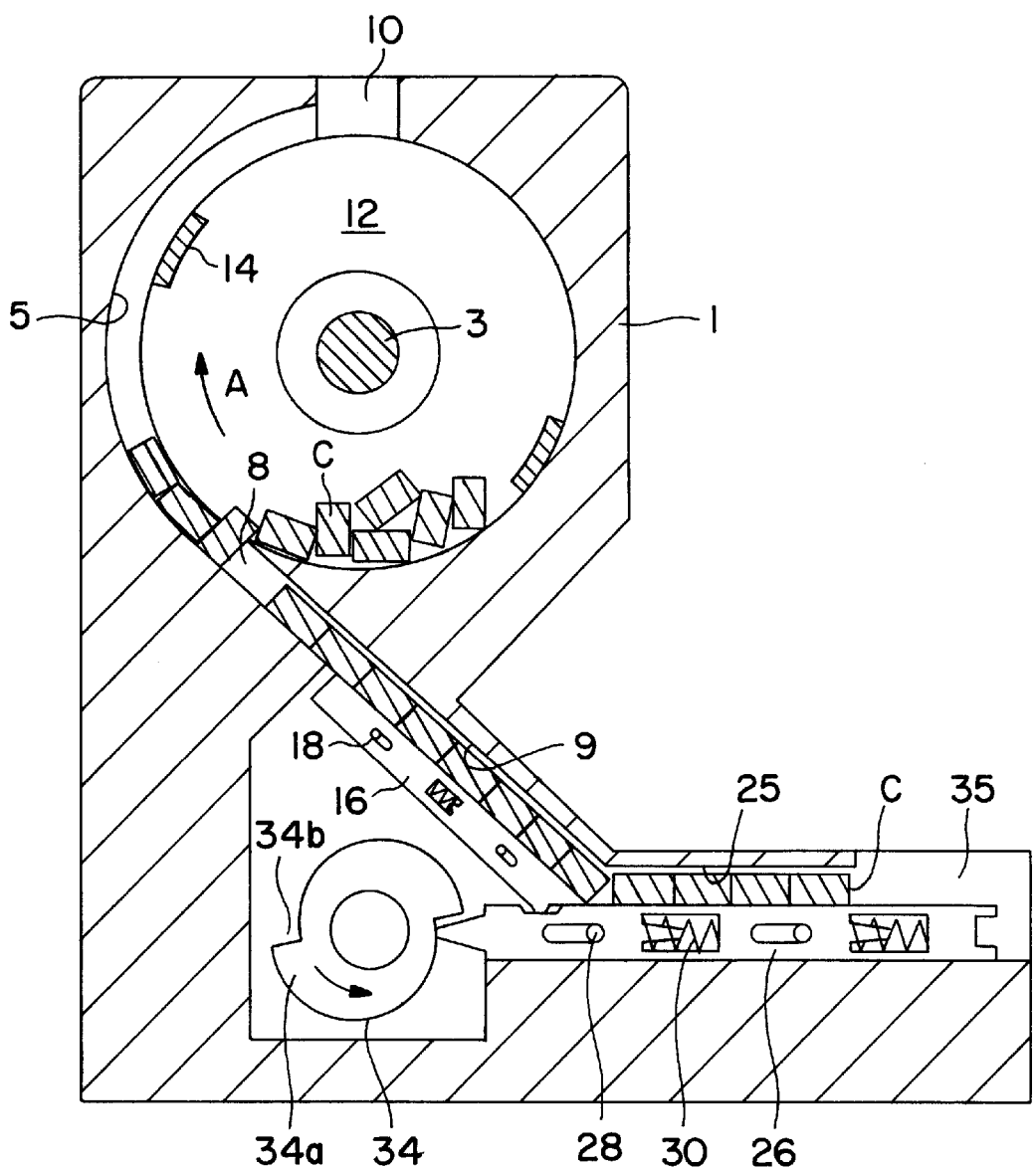
FIG. 2 is a vertical cross-sectional view of the part-conveying apparatus in FIG. 1.

FIGS. 1 and 2 are overall views of the part-conveying apparatus. The apparatus is composed of three divisions: a part-aligning division in an upper portion, a part-ejecting division in a lower portion, and a part-chute division in an intermediate portion.

It will be noted that the parts C appear relatively large in the drawings, but actual parts are very small.

First, the part-aligning division is described below.

Figure 3:
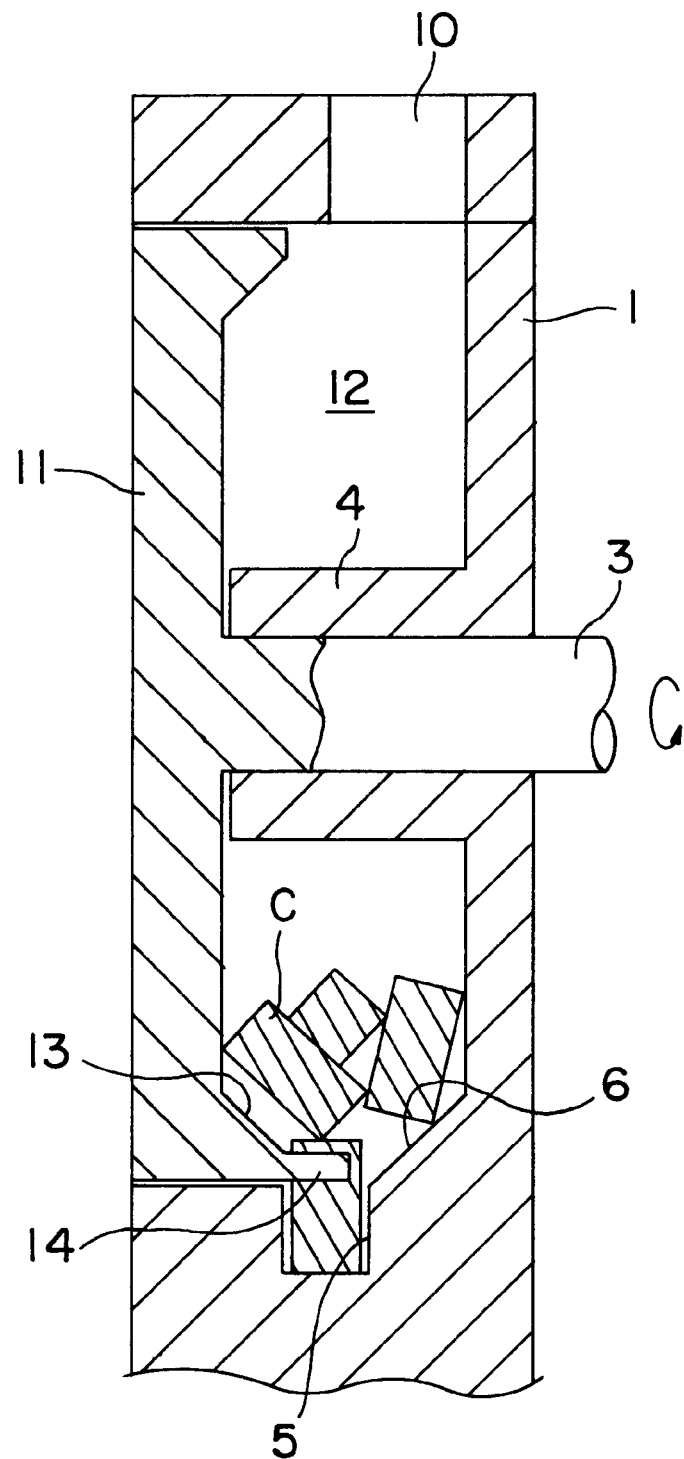
FIG. 3 is a cross-sectional view enlarged along the line III—III in FIG. 1.

The part-aligning division has a circular concave section 2 formed in a main body 1, and a rotating drum 11 fitted in the concave section 2 so as to be rotatable. In a central portion of the concave section 2, an axis 3 is arranged, and a bearing section 4 is arranged to rotatably journal the axis 3. On an inner peripheral surface of the concave section 2, a part-aligning groove 5 is formed in a semicircular arc shape whose width and depth are designed to have a constant clearance allowing the parts C of the width W and height H to pass through. As shown in FIG. 3, a tapered guide face 6 is formed sloping toward the part-aligning groove 5 on the inner peripheral surface of the concave section 2. The guide face 6 guides the parts C into the part-aligning groove 5.

A gate opening 8 is formed in a lower portion of the part-aligning groove 5. Via the gate opening 8, a chute 9 is formed so as to communicate with the part-aligning groove 5. The chute 9 is formed substantially tangential to the part-aligning groove 5 that is semicircular-arc shaped, sloping down at a given sliding angle.

The gate opening 8 is formed at an intersection of the part-aligning groove 5 and the chute 9, which are tangential to each other. The gate opening 8 has dimensions allowing the parts C to pass through one by one in a state aligned on their sides in the length direction; that is, with the height and the width which are larger than H and W, and with the length smaller than L. Also, the width of the gate opening 8 is the same as the width of the part-aligning groove 5.

A part-storing space 12 is formed between the main body 1 and the rotating drum 11. The part-storing space 12 has a storing capacity for a large number of the parts C fed in via a part-feeding opening 10. The rotating drum 11 is formed preferably of a transparent material such as an acrylic resin so that the volume of the parts C therein can be checked visually. An inner peripheral surface of the rotating drum 11 includes a tapered guide face 13 opposing the guide face 6. The guide face 13 guides the parts C into the part-aligning groove 5 in the same manner as the guide face 6.

On an inner peripheral surface of a peripheral portion of the rotating drum 11, as shown in FIG. 3, a plurality of protruding tabs 14 (two pieces are shown in the drawing) is formed at a constant angular pitch. The tabs 14 have dimensions so as to pass over the gate opening 8 and the part-aligning groove 5. The tabs 14 serve to normalize the parts C jammed at the gate opening 8.

The axis 3 is connected to a driving means, such as an electric motor, and rotates with the rotating drum 11 in the direction indicated by arrow A. In the rotation, the tabs 14 push back the parts C jammed at the gate opening 8 in the direction opposite to the chute 9, thereby recovering from the jam. The rotation method for the rotating drum 11 is not limited to the above, with which the axis 3 rotates, but other methods may be employed. Also, the rotation method is not limited to a continuous rotation method, but an intermittent rotation method may be employed.

Hereinbelow, a description will be given of operation of the part-aligning division in the above configuration.

The parts C fed from the part-feeding opening 10 and have been stored in the part-storing space 12 are guided by the guide faces 6 and 13, which are formed respectively in the main body 1 and the rotating drum 11, into the part-aligning groove 5. At this time, the parts C are aligned in a predetermined direction since the part-aligning groove 5 is formed with the width and the depth which have a constant clearance so as to allow passage of parts C having the width W and the height H.

Among the aforementioned parts C, those sliding down aligning in the length direction lying down pass through the gate opening 8 smoothly and are therefore fed to the part-ejecting division through the chute 9. On the other hand, the parts C sliding down upright are not allowed to pass through the gate opening 8, and therefore stack to block the gate opening 8. In this case, the following parts C that are also not allowed to pass through the gate opening 8 stack, causing a jam.

In the above state, when the rotating drum 11 rotates in the direction of arrow A, the tabs 14 or the parts C pushed thereby push other parts C in the direction opposite to the ejecting direction, whereby clearing the parts C stacked at the gate opening 8. At this time, a load exerted on the parts C is only the weight of other parts C following, and no other forces except for gravity are exerted thereon. Therefore, the parts C can be easily removed or laid down without adding a heavy load. This allows the parts C to be ejected smoothly from the gate opening 8.

In the above manner, the tabs 14 of rotating drum 11 remove jams occurring at the gate opening 8, but in addition, they agitate the parts C that are formed like a bridge to disturb sliding in order to expedite sliding down into the part-aligning groove 5. When the number of the parts C in the part-storing space 12 decreases, the number of the parts C that slide down into the part-aligning groove 5 also decreases. However, the tabs 14 of the rotating drum 11 serve to carry the parts C stored in a bottom section of the part-storing space 12 into the part-aligning groove 5. In this way, all the parts C in the part-storing space 12 can be ejected.

When a large number of parts C is fed into the part-storing space 12, their weight exerts a load on the parts C aligning in the vicinity of the gate opening 8. In this case, the load probably disturbs the flow of the parts C. However, since the tabs 14 of the rotating drum 11 regularly pass by the gate opening 8 and relieve the stress, the parts C are allowed to pass through the gate opening 8 smoothly.

Hereinbelow, the part-chute division is described.

In the sloped chute 9, which comprises the part-chute division, a lateral section is open in a region from a middle section to a lower section, and the open area is blocked by a lateral cover 15. A mobile blade (mobile member) 16 is provided in a bottom section of the chute 9 so as to be slidable in the direction of the chute 9. The mobile blade 16 slidably supports bottom surfaces of the parts C.

Figure 4:
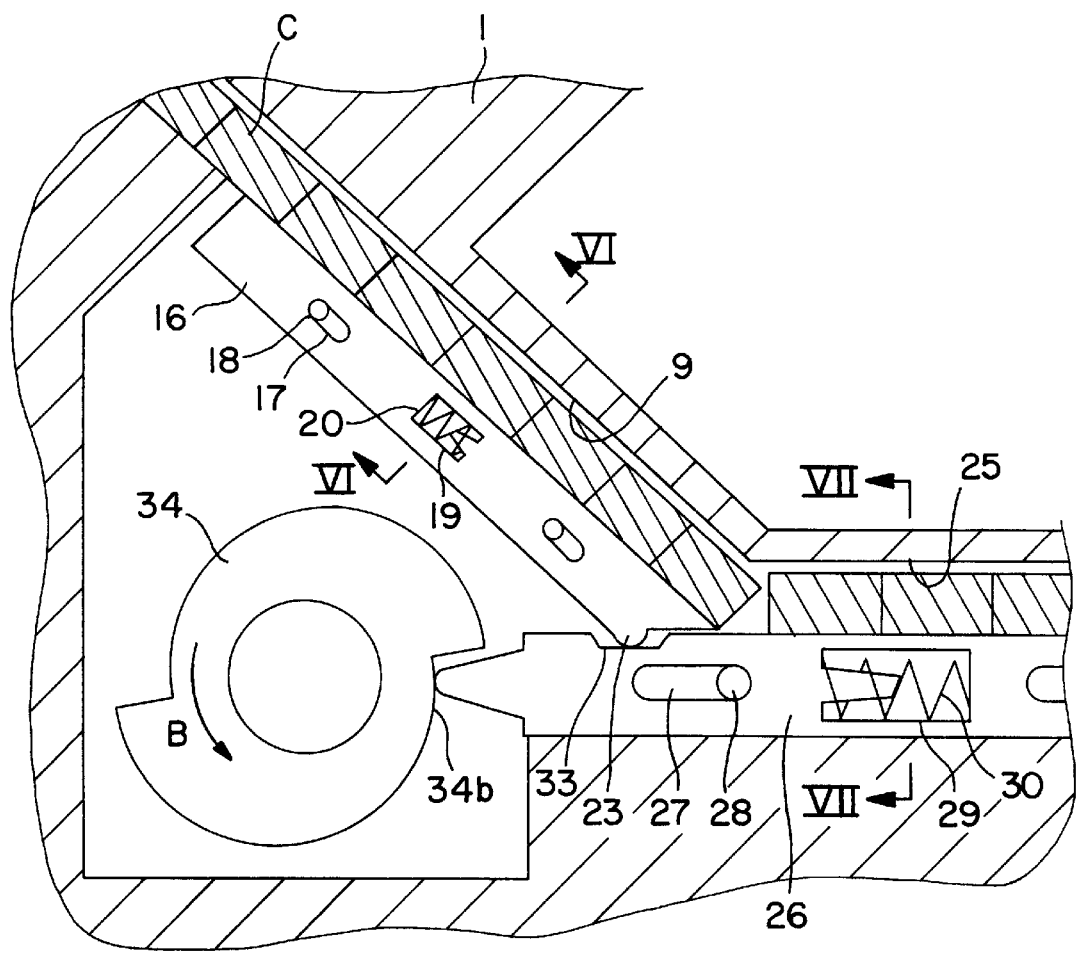
FIG. 4 is selectively-enlarged view in which a conveying blade is returned backward in the part-conveying apparatus in FIG. 1.

Specifically, the mobile blade 16 is made of a thin metal plate whose thickness is substantially the same as the width W or the height H of the part C, and as shown in FIG. 4. Long holes 17 each extending in the length direction are individually formed in front and rear portions of the mobile blade 16, and guide pins 18 protruding from the main body 1 are fitted into the long holes 17 so as to be slidable. In this manner, the mobile blade 16 is slidably guided in the direction of the chute 9. A stroke of the mobile blade 16 is limited within the range of the long hole 17, the range being smaller than the length L of the part C.

Figure 6:
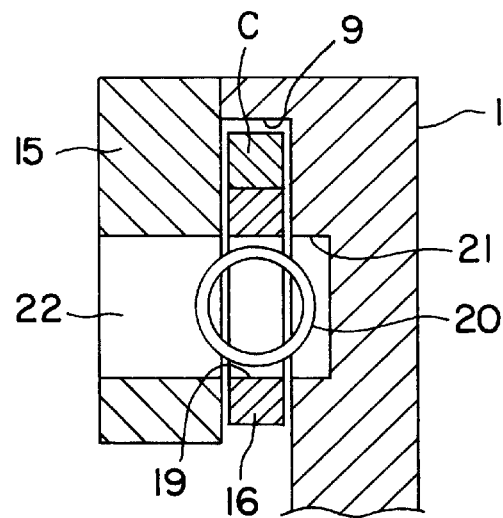
FIG. 6 is a cross-sectional view enlarged along the line VI—VI in FIG. 4.

A spring-holder hole 19 is formed in a central portion of the mobile blade 16 to store a spring 20. As shown in FIG. 6, two sides in the radial direction of the spring 20 are respectively engaged with a concave section 21 formed on the main body 1 and with an opening 22 formed in the lateral cover 15, continuously urging down the mobile blade 16 in a diagonal direction. In a lower end portion of the mobile blade 16, an projection (engaging section) 23 is formed to engage with a conveying blade 26 that is described below.

Hereinbelow, a description will be given of the part-ejecting division.

A lower end section of the chute 9 is connected to a rear end section of a horizontal guide path 25 into which the parts C that have slid down the chute 9 are carried. A lateral section of the guide path 25 is open and is blocked by the lateral cover 15. In a bottom section of the guide path 25, the conveying blade (conveying member) 26 is arranged so as to be movable forward and backward.

The conveying blade 26 slidably supports bottom surfaces of the parts C. Similarly to the mobile blade 16, the mobile blade 26 is made of a thin metal plate whose thickness is substantially the same as the width W or the height H of the part C. As shown in FIG. 4, long holes 27 each extending in the length direction are individually formed in front and rear portions of the conveying blade 26, and guide pins 28 protruding from the main body 1 are slidably fitted into the long holes 27. In this manner, the mobile blade 26 is guided so as to be movable horizontally in the back and front direction. A plurality of spring-holder holes 29 is formed in the mobile blade 26, each of them retaining a spring 30.

Figure 7:
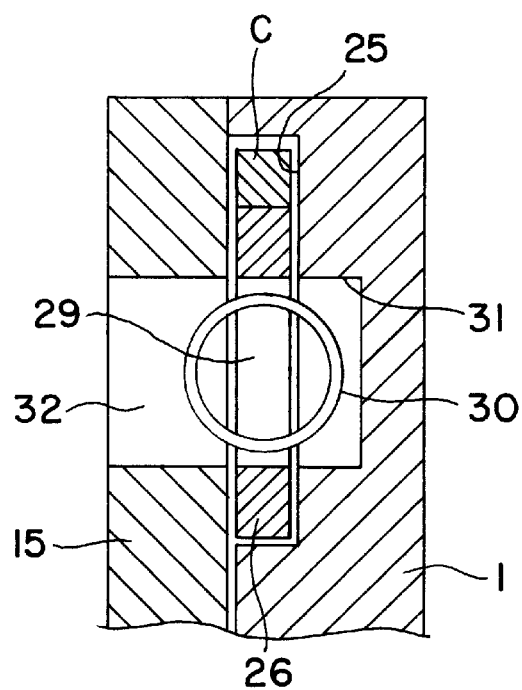
FIG. 7 is a cross-sectional view enlarged along the line VII—VII in FIG. 4.

As shown in FIG. 7, two sides in the radial direction of the spring 30 are engaged respectively with a concave section 31 formed on the main body 1 and with an opening 32 formed in the lateral cover 15, always urging the mobile blade 26 backward.

As shown in FIG. 4, on an upper surface in a rear section of the conveying blade 26, an shallow groove (engaging section) 33 is formed engageable with the projection 23, which is formed in the lower end section of the mobile blade 16. The projection 23 and the groove 33 comprise a driving means that finely moves the mobile blade 16 in the direction of the chute 9.

In a rear portion of the conveying blade 26, there is provided a cam 34 for reciprocating the conveying blade 26 in a manner so as to move backward faster than to move forward. The rear portion of the conveying blade 26 is urged by the spring 30 so as to contact a peripheral surface of the cam 34. The spring 30 and the cam 34 compose a conveying means for reciprocating the conveying blade 26.

The cam 34 has a crest section 34a and a valley section 34b and is rotationally driven by means of a motor (not shown) in the direction indicated by arrow B. When a rear end section of the conveying blade 26 proceeds over the crest section 34a of the cam 34, the conveying blade 26 advances at a low speed; when the rear end section comes down to the valley section 34b of the cam 34, the conveying blade 26 returns at a high speed.

The advancing speed of the conveying blade 26 is specified so that a predetermined supporting frictional force operates between the conveying blade 26 and the parts C sliding thereon. On the other hand, the returning speed of the conveying blade 26 is specified so that the supporting frictional forces are substantially discontinued between the conveying blade 26 and the parts C sliding thereon. Therefore, during backward and forward reciprocating movements of the conveying blade 26, the parts C placed thereon are conveyed forward intermittently. Consecutively, the parts C conveyed to a front end section of the guide path 25 are ejected one by one at an ejection position 35 by means of an ejecting device (not shown), such as that called a chip mounter.

Figure 5:
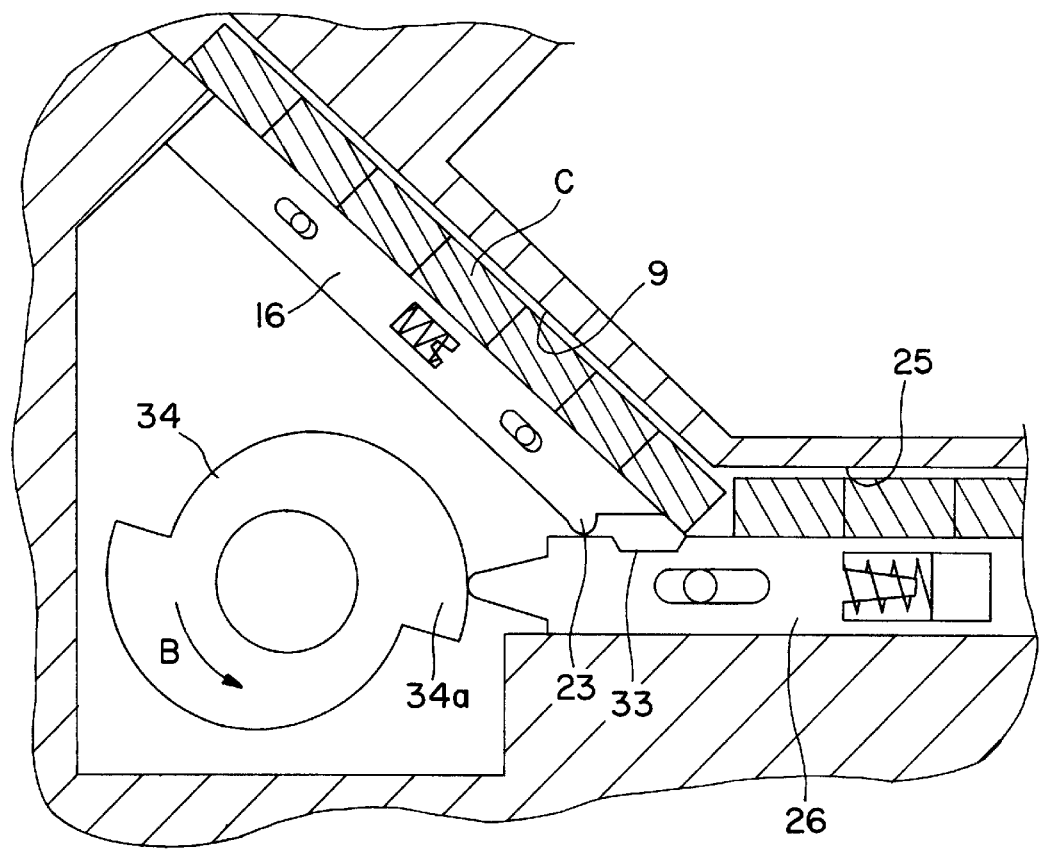
FIG. 5 is selectively-enlarged view in which the conveying blade is forwarding in the part-conveying apparatus in FIG. 1.

In repetition of each reciprocating movement of the conveying blade 26, the projection 23 of the mobile blade 16 repeats the operation of falling into groove 33 and rising therefrom, thereby allowing the mobile blade 16 to finely move in the direction of the chute 9. Specifically, as shown in FIG. 4, when the conveying blade 26 is positioned at a rear end section, the projection 23 is fallen inside the groove 33 with the mobile blade 16 being positioned at the lower end. When the cam 34 rotates to move the conveying blade 26 forward, as shown in FIG. 5, the projection 23 rises over an upper surface of the conveying blade 26 with the mobile blade 16 moving upward. In this manner, the mobile blade 16 is finely moved in the direction of the chute 9, whereby the friction between the mobile blade 16 and the parts C can be discontinued. Therefore, the parts C are allowed to slide down the chute 9 smoothly even when the parts C are of a small mass, are dirty, or are electrostatically charged.

In the above case, even at a small slope angle in the chute 9, the parts C are easily allowed to slide down smoothly. This allows reduction of the angle at which the chute 9 and the guide path 25 intersect, and the parts C can thereby be caused to move smoothly from the chute 9 into the guide path 25.

In the above embodiment, as the engaging sections, the projection 23 is provided at the lower end of the mobile blade 16, and the groove 33 is provided on the upper surface of the conveying blade 26. However, a projection arranged on an upper surface of the conveying blade 26 provides the same effects as above.

Second Embodiment

Figure 11:
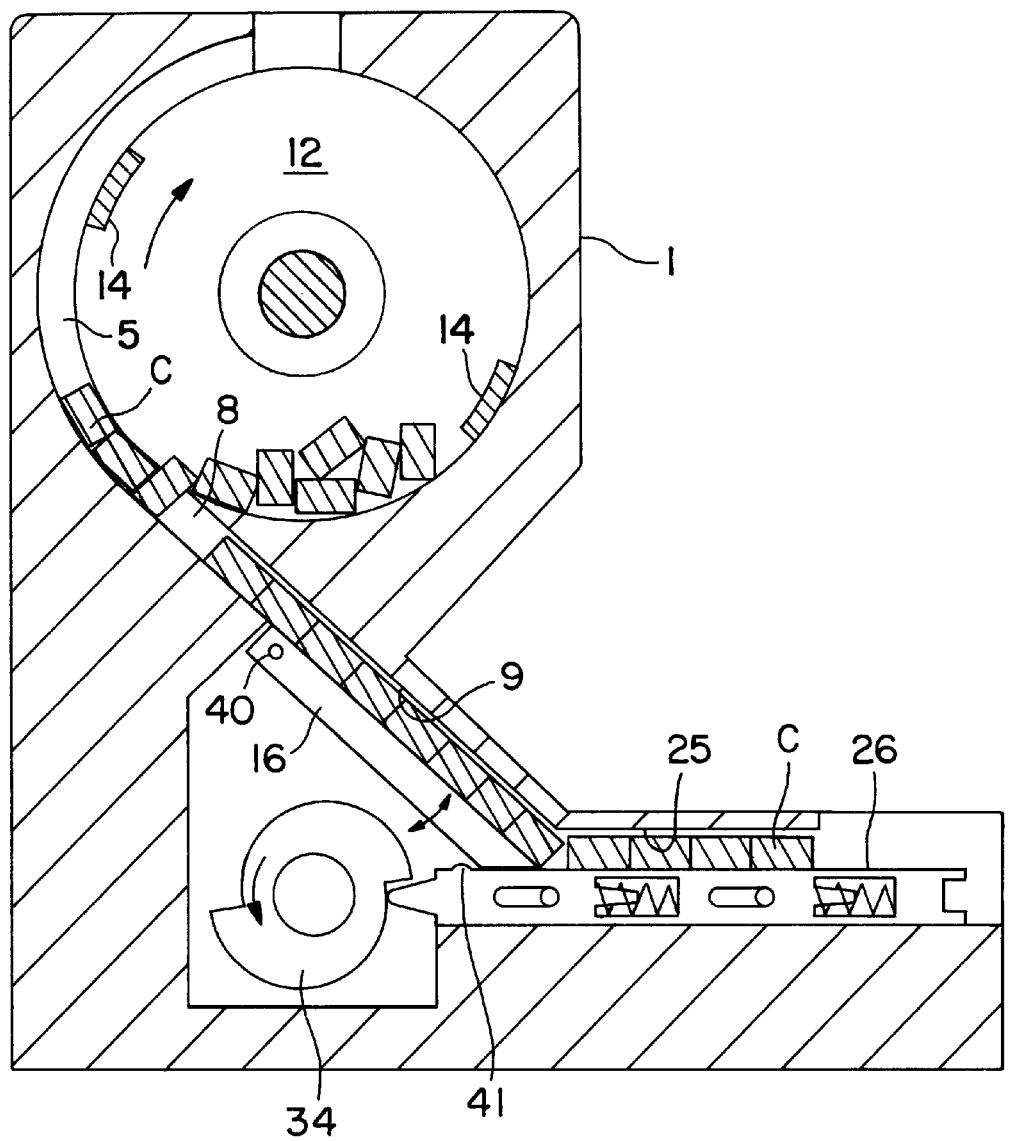
FIG. 11 is a cross-sectional view of a second embodiment according to the present invention.

FIG. 11 is view of a second embodiment according to the present invention.

In the second embodiment, a conveying blade 16 is oscillated and moved perpendicular to a chute 9, thereby discontinuing friction occurring between the mobile blade 16 and the parts C. Specifically, an upper end section of the mobile blade 16 is supported by an axis 40 so as to oscillate and move and remains at a lower position to which it has been oscillated and moved by gravity.

A projection 41 is formed on an upper surface of a conveying blade 26. When the conveying blade 26 is located at a rear end position, the projection 41 is not in contact with the mobile blade 16. When the conveying blade 26 moves to a front end position, the projection 41 oscillates and moves the mobile blade 16 upward by a fine stroke. An oscillating and moving stroke of the conveying blade 26 must be restricted so that the parts C on the conveying blade 26 are not sandwiched between the surface thereof and an upward internal surface of a chute 9.

In the above arrangement also, the mobile blade 16 is caused to oscillate and move synchronously with the forward and backward movement of the conveying blade 26, whereby the parts C on the mobile blade 16 are allowed to slide down smoothly.

Third Embodiment

Figure 12:
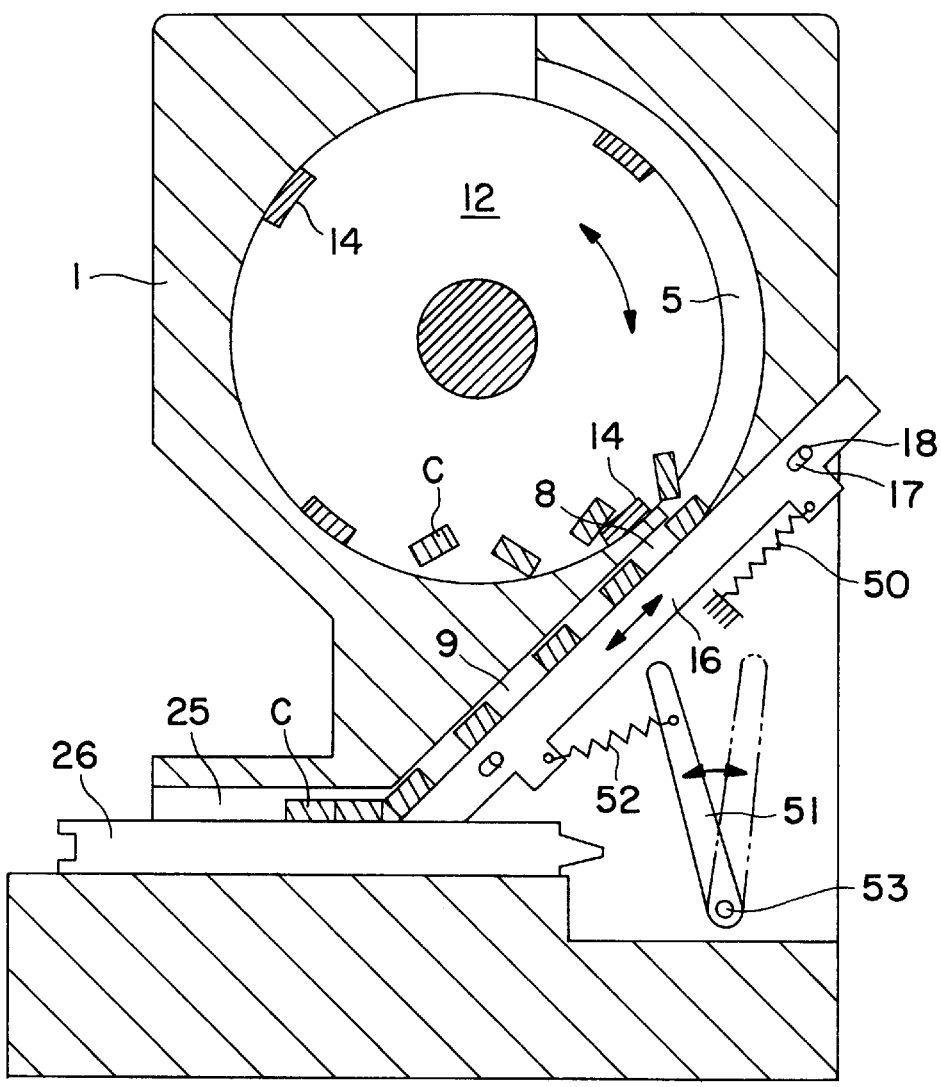
FIG. 12 is a cross-sectional view of a third embodiment according to the present invention.

FIG. 12 is a view of a third embodiment according to the present invention.

In the third embodiment, a mobile blade 16 is provided in an entire region of a chute 9. Similarly to the first embodiment, the mobile blade 16 is guided by long holes 17 and pins 18 so as to be movable only by a constant distance in the direction of the chute 9.

A first spring 50 is provided between a rear end section of the mobile blade 16 and a main body 1. The first spring 50 urges down the mobile blade 16 diagonally. A lever 51 is provided so as to oscillate and move around an axis 53 in the direction of chute 9. A second spring 52 is provided between the lever 51 and a front end section of the mobile blade 16. As the first and second springs, compression springs are used in this embodiment, but these springs may be replaced by tension springs.

In an initial condition, as shown in FIG. 12, the mobile blade 16 is moved by a force of the first spring 50 in a lower position and is in contact with or close to the conveying blade 26. The lever 51 is pulled by a force of the second spring 52, and as a result of oscillating and moving motion, it is located in a left position in FIG. 12.

As indicated by a double-dotted line in FIG. 12, when the lever 51 is oscillated and moved to the right, the second spring 52 is pulled, in which the springing force of the second spring 52 is increased to be greater than the springing force of the first spring 50. Therefore, the mobile blade 16 is pulled up diagonally by means of the second spring 52.

When the lever 51 is oscillated and moved toward the left, the state repeatedly becomes as shown in FIG. 12. In this way, repetition of these operations causes fine movements of the mobile blade 16 in the direction of the chute 9. This discontinues friction occurring between the mobile blade 16 and the parts C, thereby allowing the parts C to slide down the chute 9 smoothly.

In the above embodiment, the stroke of the mobile blade 16 is determined by long holes 17 and pins 18. Therefore, even though the lever 51 is oscillated and moved by a long distance, the stroke of the mobile blade 16 is in fact not effected. This allows an arrangement of a driving mechanism for the lever 51 to be selective. In addition, the mobile blade 16 and the conveying blade 26 are not directly engaged with each other, whereby producing the advantage of less abrasion.

In the third embodiment, the first spring 50 is provided between the main body 1 and the mobile blade 16. However, it may be provided between the mobile blade 16 and the lever 51. That is, the respective first and second springs 51 and 52 may be arranged at two sides of the lever 51. Furthermore, effects equivalent to the above can be implemented even in a arrangement such as in which one end of the second spring 52 is connected to the main body 1, and one end of the first spring 50 is connected to the mobile blade 16.

Furthermore, in the above embodiments, blades are used as mobile members and conveying members, but there is no restriction thereto. The present invention may use other members if they are movable in a predetermined direction. However, thin members such as the blades used in these embodiments achieves a reduction in weight, so that inertia effects can be also reduced. This allows the driving mechanism to be simple.

Furthermore, the parts that can be conveyed by the present invention are not restricted to chip parts, but any types of parts may be conveyed as long as they are conveyable through the chute in a state in which they are aligned.

What is claimed is:

1. A part-conveying apparatus comprising:
   a chute sloped for aligning and sliding down parts,
   a mobile member for slidably supporting the parts in a bottom section of said chute either in the direction of or perpendicular to said chute so as to be movable, and
   driving means for finely moving said mobile member either in the direction of or perpendicular to said chute.

2. A part-conveying apparatus as claimed in claim 1, comprising:
   a horizontal guide path connected to the lower end section of said chute to align and guide parts;
   a conveying member in a bottom section of said horizontal guide path arranged to be movable forward and backward, and
   conveying means for reciprocating said conveying member so as to move backward faster than to move forward and for conveying forward the parts on an upper surface of said conveying member;
   wherein said driving means is used as an engaging section formed between said mobile member and said conveying member to finely move the mobile member either in the direction of said chute or perpendicular to said chute in coincidence with forward and backward movement of said conveying member.

3. A part-conveying apparatus as claimed in claim 1, comprising a guiding means for guiding said mobile member so as to be movable by a constant distance in the direction of said chute, wherein said driving means comprises:

a first spring for urging said mobile member in a first direction, a second spring for urging said mobile member in a second direction, and a lever to which at least one of said first spring and said second spring is connected so as to oscillate and move in the direction of said chute;

wherein said lever is oscillated and moved in a first direction to increase a spring force of said second spring to be greater than a spring force of said first spring so as to move said mobile member in a second direction, and said lever is oscillated and moved in a second direction to increase a spring force of said first spring to be greater than a spring force of said second spring so as to move said mobile member in a first direction.

* * * * *